US006970310B2

(12) United States Patent
Kawaguchi et al.

(10) Patent No.: US 6,970,310 B2
(45) Date of Patent: Nov. 29, 2005

(54) DISK CONTROL APPARATUS AND ITS CONTROL METHOD

(75) Inventors: Masahiro Kawaguchi, Odawara (JP); Kenichi Kageura, Fujisawa (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 435 days.

(21) Appl. No.: 10/382,804

(22) Filed: Mar. 6, 2003

(65) Prior Publication Data

US 2003/0174562 A1 Sep. 18, 2003

(30) Foreign Application Priority Data

Mar. 12, 2002 (JP) ............................ 2002-066299

(51) Int. Cl.[7] ............................................... G11B 27/36

(52) U.S. Cl. .......................... 360/31; 360/53; 711/114; 714/6

(58) Field of Search ................. 360/31, 53; 369/53.42, 369/53.12

(56) References Cited

U.S. PATENT DOCUMENTS

| | | | | |
|---|---|---|---|---|
| 5,109,304 | A | 4/1992 | Pederson | |
| 5,581,690 | A | 12/1996 | Ellis et al. | |
| 6,119,245 | A | 9/2000 | Hiratsuka | |
| 6,192,484 | B1 | 2/2001 | Asano | |
| 6,571,310 | B1 | 5/2003 | Ottesen et al. | |
| 2002/0036850 | A1 * | 3/2002 | Lenny et al. | 360/31 |
| 2003/0210587 | A1 | 11/2003 | Yamagami et al. | |

FOREIGN PATENT DOCUMENTS

| | | | |
|---|---|---|---|
| EP | 0 551 718 | A2 | 7/1993 |
| JP | 05-041041 | | 2/1993 |
| JP | 2001-035096 | | 2/2001 |

* cited by examiner

*Primary Examiner*—Alan T. Faber
(74) *Attorney, Agent, or Firm*—Mattingly, Stanger, Malur & Brundidge, P.C.

(57) ABSTRACT

A disk system that conducts diagnoses of magnetic heads at regular or irregular interval to detect occurrence of unwritable failure. The history of regions on magnetic recording media where write operations took place is managed and a region where an unwritable failure occurred is specified. Data that corresponds to the unwritable failure is recovered by taking advantage of the redundancy of a RAID system. The disk system includes a unit that, upon reading data, checks whether the data to be read was written on the magnetic recording media through a normal write function. Through this, old data is prevented from being sent to host devices as a result of unwritable failure, and unwritable failures can be dealt with without increasing the processing time to detect unwritable failures.

21 Claims, 9 Drawing Sheets

Parity1 = Data1 XOR Data2 XOR Data3
(XOR : Exclusive OR)

DISK CONTROL APPARATUS AND ITS CONTROL METHOD

BACKGROUND OF THE INVENTION

1. Field of the Invention

The present invention relates to a technology that serves as a countermeasure for a peculiar write failure of a magnetic disk apparatus that occurs posteriorly (e.g., post-shipping), and more particularly to a technology that serves as a countermeasure for a failure in which data cannot be written on magnetic recording media of a magnetic disk apparatus and the magnetic disk apparatus itself is unable to detect that the data could not be written.

2. Related Background Art

In one magnetic disk write/read diagnosis method, whether a magnetic disk apparatus is operating normally is diagnosed and verified by writing data on the magnetic disk apparatus and reading written data to compare it against original data.

Also, a RAID apparatus is known as an external memory apparatus that can significantly enhance the adaptability of the apparatus as a whole instead of the reliability of individual magnetic disk apparatuses by its redundant structure that combines a plurality of magnetic disk apparatuses ("*A Case for Redundant Arrays of Inexpensive Disks* (*RAID*)", Patterson, et al., Proc. ACM SIGMOD, June 1988).

Magnetic disk apparatuses that achieve high recording density by using a composite magnetic head with a dedicated magnetic head for recording and another for reproduction are the mainstream. Conventionally, a single inductive head was used both for data recording and reproduction, which allowed an early discovery of any abnormality during reproduction. A composite magnetic head also allows an early discovery of abnormality with the reproduction head, but has a difficulty in finding abnormality of the recording head. Recording heads generally have high reliability and abnormalities rarely occur in them, but reliability of recording must be ensured even if such abnormalities occur only rarely.

If a rare and peculiar failure occurs in which no information is actually stored on the surface of magnetic recording media but the magnetic disk apparatus itself fails to issue any failure signals (hereinafter called "unwritable/unnotifying failure"), pre-write data remains on the magnetic recording media. If the region in question is read, the magnetic disk apparatus itself is not aware of, and cannot detect, the abnormality and instead reads the data remaining, which is sent to a central processing unit and other host devices. Such a peculiar failure consequently cannot be eliminated even in structures used in RAID apparatuses. In other words, data lost through an unwritable/unnotifying failure cannot be recovered even in a RAID apparatus structure.

More specifically, class 4 and class 5 structures of RAID in RAID technology use, as a redundant data (parity) creating unit when writing information, pre-update data, new data and pre-update parity to create a new parity.

If the unwritable/unnotifying failure occurs in pre-update data and pre-update parity, which are base data to create a new parity, the new parity created becomes improper. As a result, when the RAID apparatus detects the failure at this stage and attempts to create data of the failed magnetic disk apparatus using other, normally operating magnetic disk apparatuses, it would create an improper data.

The inventors of the present application examined a method of diagnosing every time a write operation is executed, as well as a method of diagnosing at a certain time interval, as a timing to diagnose a magnetic disk apparatus itself.

The former can detect a failure when an unwritable/unnotifying failure occurs, but it requires processing time for diagnosis. Specifically, normal magnetic disk apparatuses require a waiting time that is at least equivalent to one revolution of magnetic disk media to read data that has been written. In a magnetic disk apparatus whose media's number of revolutions is 10,000 rpm, there would be an increase in waiting time and an increase in write verification processing time of at least 6 msec.

In the latter, an increase in write verification processing time for every execution of write operation can be prevented. However, if an unwritable/unnotifying failure occurs between one diagnosis and the next on a magnetic disk apparatus, data that caused such a failure (i.e., old data that remains) would be sent to host devices.

SUMMARY OF THE INVENTION

The present invention relates to a countermeasure for the peculiar failure described above, whereby if an unwritable/unnotifying failure occurs, an external memory device recovers the unwritable data from backup data or journal data by specifying the region in which the unwritable failure occurred.

The present invention also relates to a technology to detect unwritable/unnotifying failures while limiting the increase in prescribed input/output processing time, including write processing.

In accordance with an embodiment of the present invention, diagnoses of magnetic heads are conducted at regular or irregular interval in order to detect occurrence of unwritable failure. When an unwritable failure is found, the history of the regions where the write operation took place is managed and a region where the unwritable failure occurred is specified. Data that corresponds to the unwritable failure is recovered by taking advantage of the redundancy of RAID 5.

The present embodiment may include a unit to check whether the data to be read was written on magnetic recording media through a normal write function when reading data. Through this, old data is prevented from being sent to host devices as a result of unwritable failure.

According to the present invention, unwritable failures can be dealt with without increasing the processing time to detect unwritable failures.

In accordance with an embodiment of the present invention, a magnetic disk apparatus may be equipped with: 1) a function to detect the occurrence of an unwritable failure by actually writing data on magnetic recording media, reading the data written, and comparing the data against original data before the data was written; and 2) a function to specify a failed region in which the unwritable failure occurred in recording regions.

3) A magnetic disk apparatus may be provided with a magnetic head diagnosis unit that tests each magnetic head by securing a diagnosis region to be used for diagnosis on the corresponding recording medium, periodically positioning the magnetic head in the diagnosis region, writing diagnostic data in the diagnosis region, and then reading and comparing the diagnostic data written against the diagnostic data.

The magnetic head may include a plurality of magnetic heads, and for the magnetic head diagnosis unit, a region (a diagnostic region) to write the diagnostic data can be allocated for each of the magnetic heads. Diagnostic regions for the magnetic heads may be positioned on the corresponding magnetic recording media at locations shifted from one another by an amount corresponding to the time required for a switching processing to switch the plurality of magnetic heads, such that the plurality of magnetic heads can read and write data in one revolution of the magnetic recording media.

The magnetic head diagnosis unit may have a function to allocate a region to write diagnostic data, to read the diagnostic data after it is written, and to check that there are no defects in the magnetic recording media.

4) The magnetic disk apparatus may be provided with a write region management unit that stores regions corresponding to write requests issued by a host device. The write region management unit executes a test of the magnetic heads when the number of write regions registered exceeds a stipulated value; if all of the magnetic heads are found to be operating normally, the write regions that were registered through the write region management unit are cleared; if there is even one malfunction among the magnetic heads, a failure may be reported in response to all read requests and write requests from the host device.

5) Furthermore, the write region management unit may execute a test of the magnetic heads at a specified time interval; if all of the magnetic heads are found to be operating normally, the write regions that were registered through the write region management unit are cleared; if there is even one malfunction among the magnetic heads, a failure may be reported in response to all read requests and write requests from the host devices.

In accordance with an embodiment of the present invention, a RAID apparatus may include magnetic disk apparatuses having the function in 1) or the unit in 3) described above. A disk control apparatus of the RAID apparatus may be provided with the following: 6) a first unit that, when an occurrence of an unwritable failure is reported from any one of the magnetic disk apparatuses, reproduces data in the failed magnetic disk apparatus from the remaining magnetic disk apparatuses excluding the magnetic disk apparatus related to the report (i.e., the failed magnetic disk apparatus); 7) a second unit that compares the data reproduced through the first unit against data stored in the failed magnetic disk apparatus; and 8) a third unit to display as an unwritable region the region whose data is found by the second unit not to correspond to original data in the failed magnetic disk apparatus. Through these units, the region that has become unwritable can be specified even when an unwritable failure occurs.

In accordance with another embodiment of the present invention, a RAID apparatus may include magnetic disk apparatuses having the functions and/or units described above, and has a spare magnetic disk apparatus. A disk control apparatus of the RAID apparatus may be provided with the following: 9), a data recovery unit that, when an occurrence of an unwritable failure is reported from any one of the magnetic disk apparatuses, reproduces data in the failed magnetic disk apparatus from the remaining magnetic disk apparatuses excluding the magnetic disk apparatus related to the report (i.e., the failed magnetic disk apparatus) and stores the recovered data in the spare magnetic disk apparatus; 10) a unit to compare the data stored in the spare magnetic disk apparatus that stores data that was recovered through the data recovery unit against data in the failed magnetic disk apparatus; and 11) a unit to display as an unwritable region the region whose data is found by the unit to compare not to correspond to original data in the failed magnetic disk apparatus. Through these units, the region that has become unwritable can be specified by comparing data stored in it against data in the spare magnetic disk apparatus when an unwritable failure occurs.

Furthermore, the magnetic disk apparatus may include 12) a function not to send to a host device wrong data (i.e., old data that remains and that is reproduced due to the fact that new data has become unwritable) when an unwritable failure occurs.

In accordance with an embodiment of the present invention, a magnetic disk apparatus may include: a magnetic head diagnosis unit that tests each magnetic head by securing a region to be used for diagnosis on a corresponding recording medium and positioning the magnetic head on the diagnosis region; after writing diagnostic data in the diagnosis region, reading and comparing the data against the diagnostic data; a write region management unit that stores regions in response to data write requests from a host device; a function to store data write regions through the write region management unit when data write requests are issued by a host device; a read region determination unit that, when a data read request is issued by a host device, determines if a part or all of regions to be read corresponds to the data write regions that are stored by the read region management unit; a function that, when a part or all of the read regions to be read in response to a read request from a host device corresponds to the data write regions, that tests with the magnetic head diagnosis unit whether the data was correctly recorded on the magnetic recording media when it was written; and a unit that, if it is determined through the magnetic head diagnosis unit that the data was correctly written on the magnetic recording media, reads and transfers data from the magnetic recording media to a host device in response to a read request from the host device, and if it is determined that the data was not written normally, reports a read failure to the host device. Through these units, wrong data resulting from unwritable failures can be prevented from being sent to the host device.

According to the present invention, even if a failure in which data cannot be written on magnetic recording media and which cannot be detected occurs in a magnetic disk apparatus, the region in which the unwritable failure occurred can be specified, so that failure recovery can be performed securely.

In addition, even if an unwritable failure occurs, transfer of improper data can be limited and measures to do so can be realized without causing any decline in the performance of the magnetic disk apparatus or a system using such a magnetic disk apparatus.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

Preferred embodiments of the present invention are described with reference to the accompanying drawings.

Figure 1:
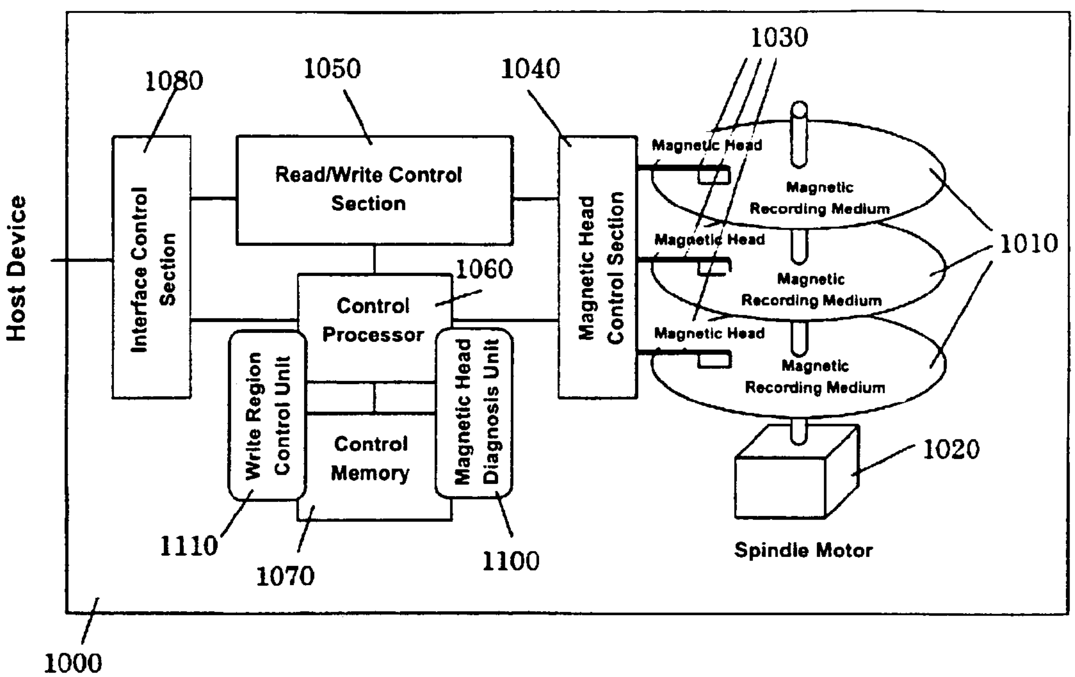
FIG. 1 is a block diagram of an overview of a magnetic disk apparatus in accordance with an embodiment of the present invention.

FIG. 1 schematically shows a magnetic disk apparatus 1000 in accordance with an embodiment of the present invention.

The magnetic disk apparatus 1000 includes magnetic recording media 1010, a spindle motor 1020 that rotates the magnetic recording media 1010, magnetic heads 1030 that read and write data to and from the magnetic recording media 1010, a magnetic head control section 1040 that controls the magnetic heads 1030, an interface control section 1080 that controls an interface with host devices, a read/write control section 1050 that executes input/output requests from a host device, a control processor 1060 that allows the various control sections to function in an coordinately linked manner, and a control memory 1070 that stores programs that operate on the control processor 1060, as well as parameters and other control information.

The magnetic disk apparatus 1000 is programmed with a magnetic head diagnosis unit 1100 that tests whether the magnetic heads 1030 are operating normally, as well as a write region management unit 1110 that responds to write requests from a host device and records regions that correspond to the write requests.

Figure 2:
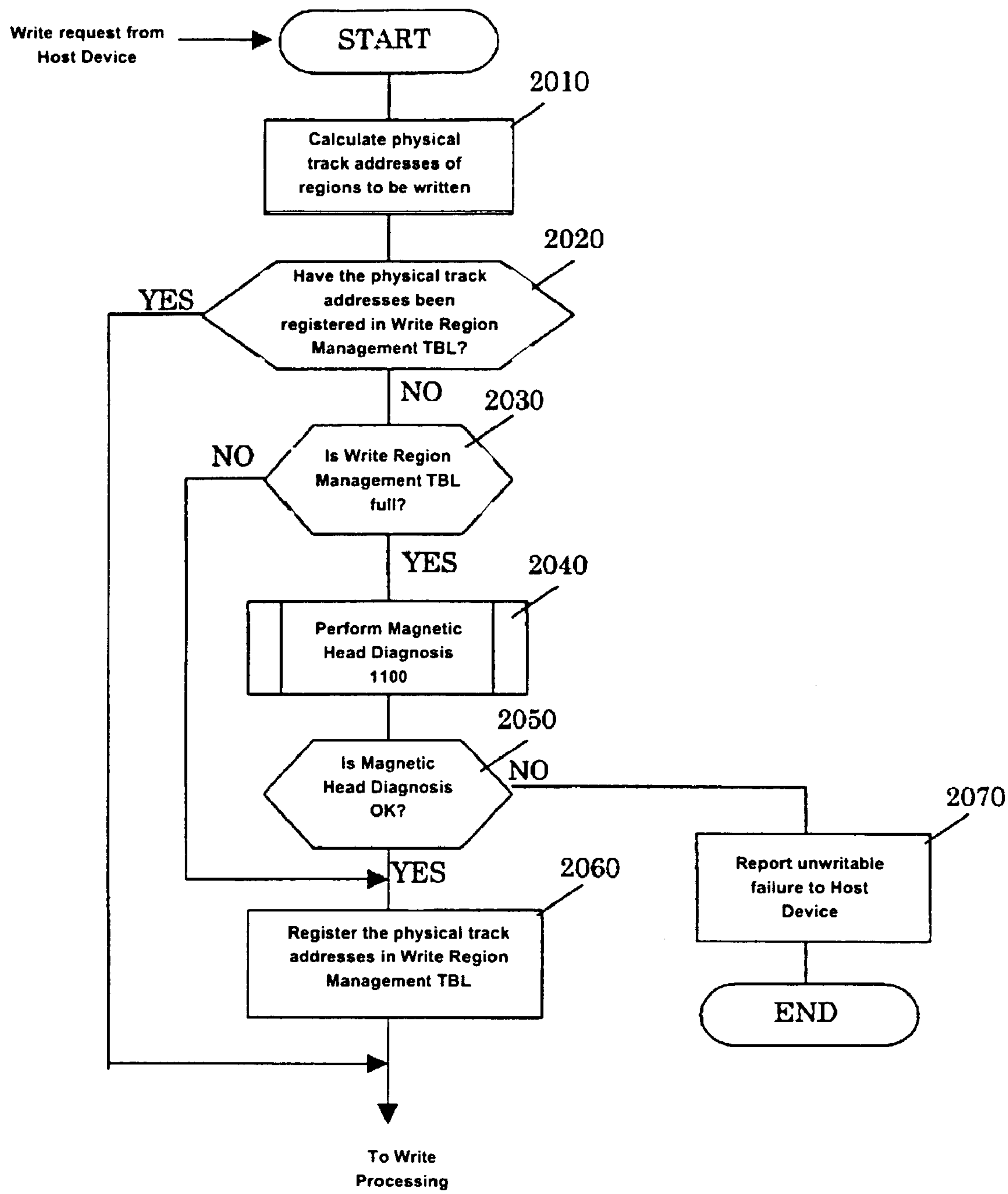
FIG. 2 is a flowchart indicating the processing of a write region management unit in FIG. 1.

FIG. 2 is a flowchart indicating the flow of processing of the write region management unit 1110.

The write region management unit 1110 operates when a write request is issued by a host device. In step 2010, physical track addresses of regions that are to be written in response to a write request from the host device are calculated. This is due to the fact that write region management units in the present embodiment are in units of physical tracks.

In step 2020, whether the regions corresponding to the write request from the host device and as calculated in step 2010 are already registered in a write region management table (table it is hereinafter abbreviated "TBL" when appropriate) is checked. If the write request regions are determined to be registered already in the write region management TBL, a write processing in response to the request from the host device is executed.

If the write request regions are determined not to be registered in the write region management TBL, whether there are any blank entries in the write region management TBL is determined in step 2030. If as a result of this determination it is determined that there are no blank entries in the write region management TBL, the magnetic head diagnosis unit 1100 is executed to check whether a data write mechanism of the magnetic disk apparatus 1000 is operating normally (step 2040).

The magnetic head diagnosis unit 1100 conducts a test by actually writing data on the magnetic recording media using all of the magnetic heads 1030 mounted on the magnetic disk apparatus 1000. If all of the magnetic heads 1030 are confirmed to be operating normally, the write requests from the host device as registered in the write region management TBL are determined to have been performed normally and the write region management TBL is cleared. In other words, the magnetic head diagnosis unit 1100 is executed through step 2040 and step 2050 in order to secure blank entries in the write region management TBL.

If in step 2030 blank entries are found in the write region management TBL, the regions corresponding to the write request from the host device are registered in the write region management TBL in step 2060 and a write processing is executed.

If in step 2030 no blank entries are found in the write region management TBL, after the magnetic head diagnosis unit 1100 is executed to secure blank entries in the write region management TBL, the regions that correspond to the write request from the host device are registered in the write region management TBL in step 2060 and a write processing is executed.

If as a result of executing the magnetic head diagnosis unit 1100 it is determined in step 2050 that an unwritable failure has occurred, the unwritable failure is reported (step 2070) in response to the write request from the host device and the write processing is terminated.

Figure 3:
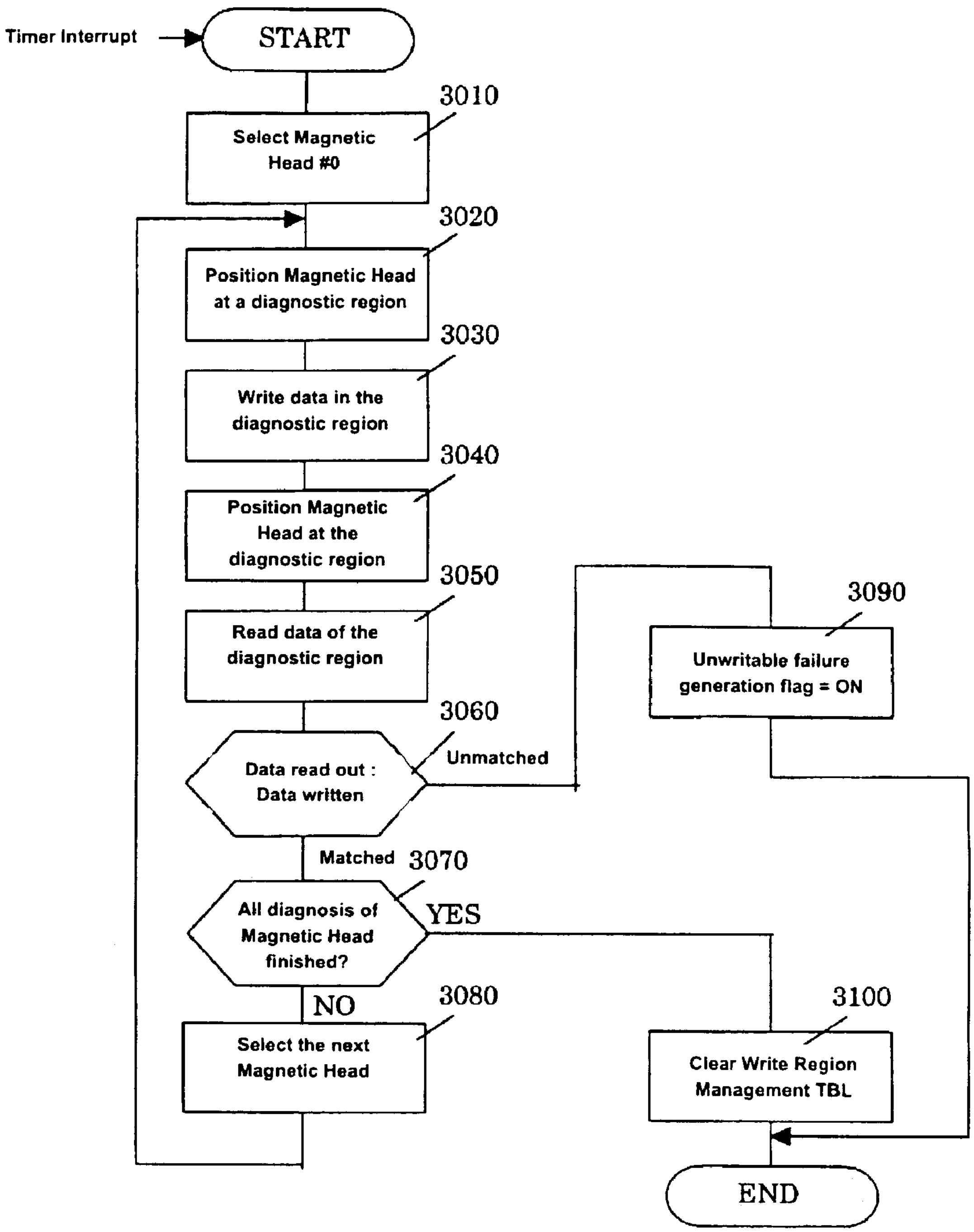
FIG. 3 is a flowchart indicating the processing of a magnetic head diagnosis unit in FIG. 1.

Referring to FIG. 3, the operation of the magnetic head diagnosis unit 1100 will be described.

The magnetic head diagnosis unit 1100 is started by the write region management unit 1110 or started periodically. The magnetic head diagnosis unit 1100 has a function to diagnose whether the write mechanism of the magnetic disk apparatus 1000 is functioning normally; after writing diagnostic data in diagnostic regions of the magnetic recording media 1010 using all magnetic heads 1030 that are mounted on the magnetic disk apparatus 1000, the magnetic head diagnosis unit 1100 reads data from the diagnostic regions and tests whether the diagnostic data were written correctly on the magnetic recording media 1010 (step 3020–step 3060).

If as a result of the test it is determined that the diagnostic data were not correctly written, i.e., that an unwritable failure has occurred, an unwritable failure flag is set in step 3090. If the unwritable failure flag is set, an unwritable failure is reported in response to all input/output requests made to the magnetic disk apparatus 1000.

If as a result of the test it is determined that the diagnostic data were written correctly with all magnetic heads 1030, the write region management TBL is cleared in step 3100.

Diagnostic data is controlled in such a manner that a unique diagnostic data is used every time a magnetic head diagnosis is executed. A method to read diagnostic data after writing it has been indicated as a magnetic head diagnosis method in the present embodiment. However, since there is a possibility of a malfunction of the magnetic recording media occurring in the diagnostic region, another method may be used in which data in a diagnostic region is first read, and diagnostic data is then written and read.

Figure 4:
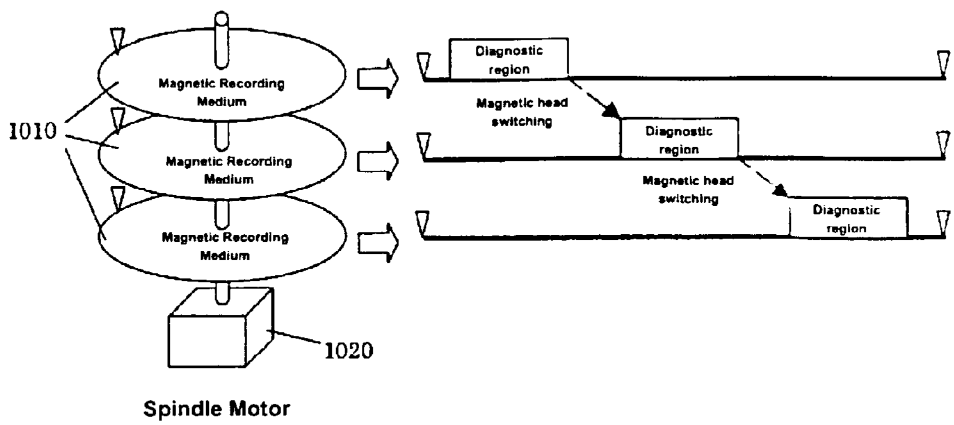
FIG. 4 is a diagram indicating the placement of diagnostic regions in order to achieve high-speed processing of the magnetic head diagnosis unit.

In addition, in order to shorten the magnetic head diagnosis processing time, the diagnostic region for each of the magnetic heads 1030 can be positioned on the corresponding magnetic recording medium 1010 at locations shifted or staggered from one another by an amount corresponding to the time required for magnetic head switching processing, as shown in FIG. 4. By doing this, writing or reading data to and from the diagnostic regions using the plurality of magnetic heads 1030 can be done in one revolution of the magnetic recording media 1010, which shortens the magnetic head diagnosis processing time.

If an unwritable failure occurs, it is reported in response to all input/output requests from the host device (step 3090, FIG. 3). As the failure is reported, the host device reads contents of the write region management TBL from the magnetic disk apparatus 1000. The unwritable regions that the magnetic disk apparatus 1000 reports to the host device are reported after being converted into logical addresses recognizable by the host device.

As described above, according to the present embodiment, in the event an unwritable failure occurs in the magnetic disk apparatus 1000, the unwritable failure is notified to the host device, and regions of the magnetic recording media 1010 in which writing could not be performed are reported to the host device.

Figure 5:
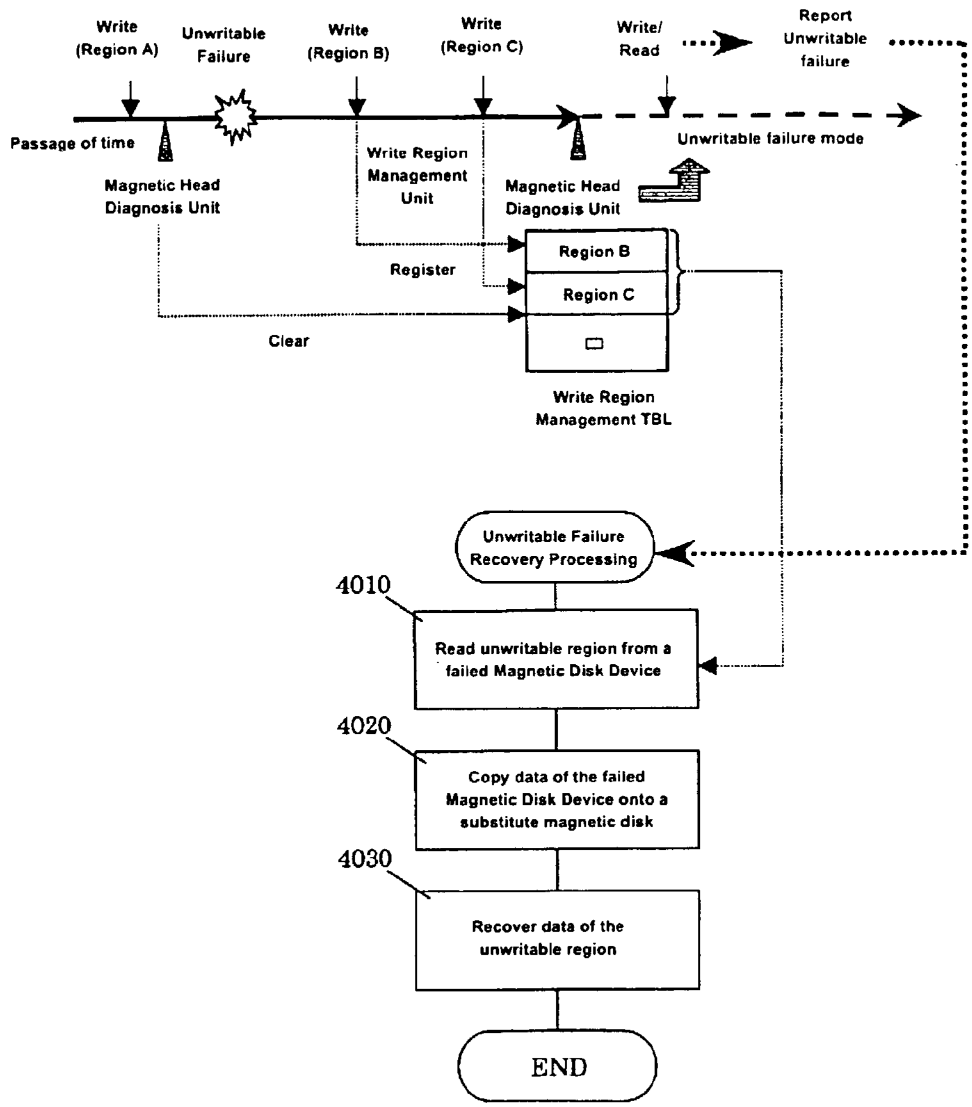
FIG. 5 is a diagram indicating the procedure to detect an unwritable failure and to recover from failure in accordance with an embodiment of the present invention.

FIG. 5 illustrates the process described above in greater detail. As the magnetic head diagnosis unit 1100 is executed, regions in which write operations have taken place are stored as a region B, a region C, etc. in the write region management TBL. If an unwritable failure is detected posteriorly through the execution of the magnetic head diagnosis unit 1100, there is a possibility that a region that is registered in the write region management TBL is unwritable.

As a result, a recovery procedure for an unwritable failure involves reading regions that may possibly be unwritable from the failed magnetic disk apparatus 1000 in which a failure has been detected, as indicated in step 4010, and copying the regions onto a normally operating magnetic disk apparatus 1000 that substitutes for the failed magnetic disk apparatus 1000 (step 4020). Next, data in the regions in which a write operation could not be performed is recovered from journal data or other redundant data parts (step 4030). This allows a recovery from a failed state.

Figure 6:
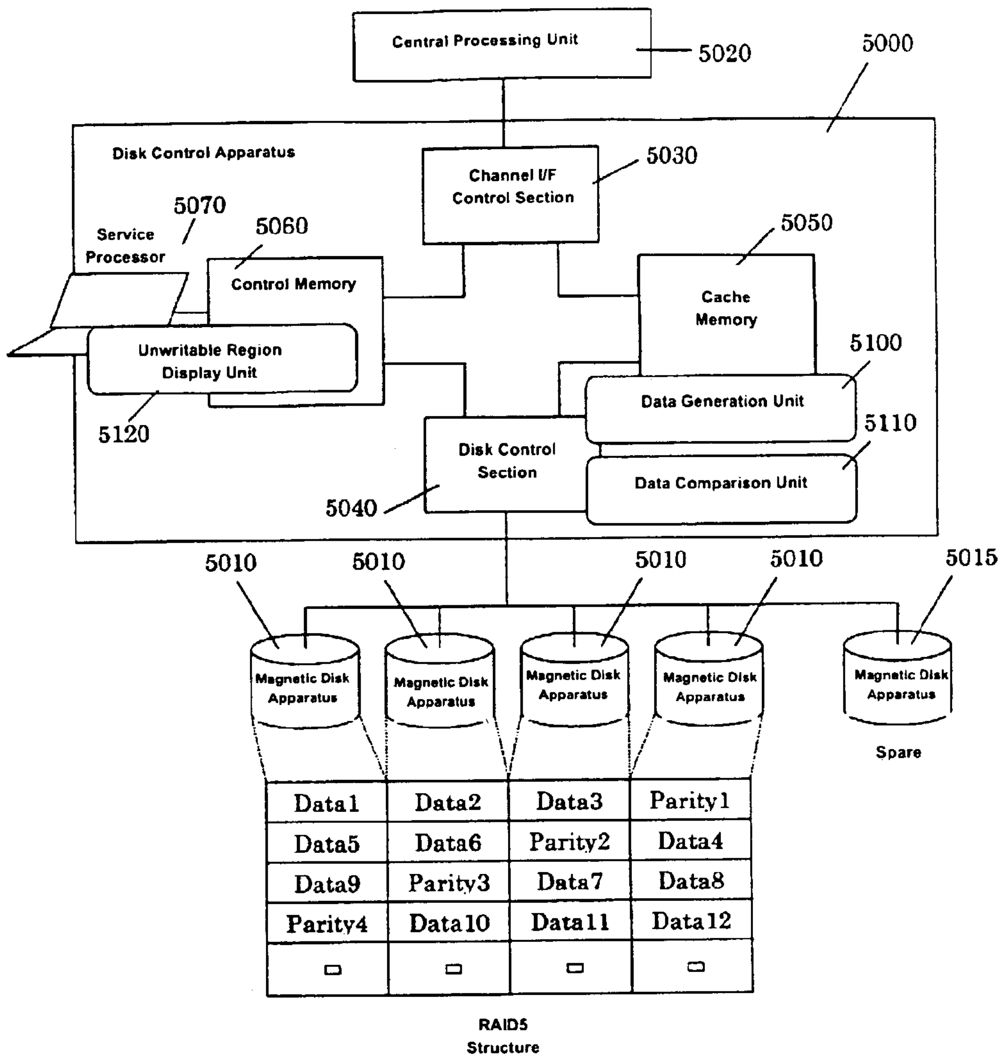
FIG. 6 is a schematic diagram indicating a system configuration of another embodiment.

FIG. 6 schematically shows a block diagram of a disk system in accordance with an embodiment of the present invention.

The disk system according to the present embodiment includes a disk control apparatus 5000 and magnetic disk apparatuses 5010.

The disk control apparatus 5000 has the magnetic disk apparatuses 5010 connected as its subordinates and is also connected to a central processing unit 5020, which is a host device.

The magnetic disk apparatuses 5010 may be identical to the magnetic disk apparatus 1000 described earlier, or they may be magnetic disk apparatuses without the write region management unit 1110.

The disk control apparatus 5000 is provided with a channel interface control section 5030 that controls interface with the central processing unit 5020 and a disk control section 5040 that controls interface with the magnetic disk apparatuses 5010. Each of these control sections comprises a data transfer control circuit and other control circuits, a control processor that controls the control circuits, and a memory that stores programs that operate on the control processor (none of which is shown).

The disk control apparatus 5000 is also provided with a cache memory 5050 that stores write data from the central processing unit 5020 and read data from the magnetic disk apparatuses 5010, a control memory 5060 that stores control information between the control sections, and a service processor 5070 that implements maintenance.

The disk control section 5040 has a function to structure a plurality of its subordinate magnetic disk apparatuses 5010 in a RAID 5 structure. RAID 5 refers to a structure that creates redundant data (redundant data according to the present embodiment is parity) based on data transferred from the central processing unit 5020 and that positions the parities among various magnetic disk apparatuses 5010 in a circulating manner so as to prevent the parities from being fixed to any particular magnetic disk apparatus.

In the present embodiment, there is a spare magnetic disk apparatus 5015. The spare magnetic disk apparatus 5015 is a substitute magnetic disk apparatus that is employed when one of the magnetic disk apparatuses 5010 that comprise the RAID 5 fails.

The spare magnetic disk apparatus 5015 is functionally linked to a data creating unit 5100 that, in the event one of the magnetic disk apparatuses 5010 fails, recovers/creates from data in the other normally operating magnetic disk apparatuses 5010 the data that was stored in the failed magnetic disk apparatus 5010, as well as to a data comparison unit 5110 that performs an exclusive OR (XOR: Exclusive OR) on data read from the plurality of magnetic disk apparatuses 5010 and determines whether the result is zero.

The service processor 5070 is equipped with an unwritable region display unit 5120 that displays regions whose results of exclusive OR performed by the data comparison unit 5110 were not zero. The service processor 5070 in addition has an input/output unit such as a keyboard, a display screen and a processor. The input/output unit is used to designate whether to implement a head diagnosis function when the power is turned on in the disk system, when one of the magnetic disk apparatuses 5010 is replaced, or when the magnetic disk apparatuses 5010 are expanded. Such a designation is directed by the magnetic disk control apparatus 5000 to the magnetic disk apparatuses 5010. Additionally, the input/output unit is used to designate parameters that are used to detect failures in the magnetic head diagnosis function when the power is turned on in the disk system, when one of the magnetic disk apparatuses 5010 is replaced, or when the magnetic disk apparatuses 5010 are expanded.

Next, the operation that takes place when an unwritable failure occurs in one of the magnetic disk apparatuses 5010 is described.

Unwritable failures are detected and reported through the magnetic head diagnosis unit 1100 that was described earlier. Upon receiving a report of an unwritable failure, the disk control section 5040 uses the data comparison unit 5110 to specify regions that have become unwritable. More specifically, in the RAID 5 structure described earlier:

Data1 XOR Data2 XOR Data3=Parity1

The new parity that is created when a write request for Data2*a* is issued to Data2 is as follows:

Data1 XOR Data2*a* XOR Data3=Data2 XOR Data2*a* XOR Parity1=Parity 1*a*

If an unwritable failure occurs in this state when writing Data2*a* onto the magnetic disk apparatus 5010, Data2 remains instead of Data2*a* that was supposed to be written on the recording medium. Consequently, when data is read from each of the magnetic disk apparatuses 5010 that comprise the RAID 5 and an exclusive OR is performed through the data comparison unit 5110, the following is the result:

Data1 XOR Data2 XOR Data3 XOR Parity1*a*=Data1 XOR Data2 XOR Data3 XOR Data1 XOR Data2*a* XOR Data3=Data2 XOR Data2*a*

The result is not zero and the region in which the unwritable failure has occurred can be specified.

The region in which the unwritable failure has occurred extracted with the data comparison unit 5110 is displayed on the service processor 5070 with the unwritable failure display unit 5120. Next, data that was created by the data creating unit 5100 that creates data that was stored in the magnetic disk apparatus 5010 for which the failure was reported is stored in the spare magnetic disk apparatus 5015. Further, by recovering from journal data and other data the data in the unwritable region as displayed on the service processor 5070, the data that corresponds to the unwritable failure that occurred in the magnetic disk apparatus 5010 can be entirely recovered/created.

In another system, a data creating unit 5100 may be provided within each magnetic disk apparatus 5010. Such a system may be composed in a manner nearly identical to the embodiment described above with reference to FIG. 6. However, whereas in the embodiment described above the data creating unit 5100 is provided within the disk control apparatus 5000, the data creating unit 5100 is provided within each of the magnetic disk apparatuses 5010 in accordance with a modified embodiment.

In the modified embodiment, when an unwritable failure is reported from one of the magnetic disk apparatuses 5010, data in the failed magnetic disk apparatus 5010 is recovered to a spare magnetic disk apparatus 5015 through the data creating unit 5100 that is part of the failed magnetic disk apparatus 5010. Next, the region in which the unwritable failure occurred is specified by comparing contents of the spare magnetic disk apparatus 5015 and the failed magnetic disk apparatus 5010 through a data comparison unit 5110.

More specifically, when data is created with the data creating unit 5100 from a region in which an unwritable failure has occurred, the following is the result:

Data1 XOR Data3 XOR Parity1*a*=Data2*a* and Data2*a* is recovered on the spare magnetic disk apparatus 5015.

In the meantime, since Data2 that was present before the unwritable failure occurred is stored on the failed magnetic disk apparatus 5010, performing an exclusive OR of these data does not result in zero, so that unwritable regions can be specified with the data comparison unit 5110.

In earlier embodiments, there was a function to specify the unwritable region when an unwritable failure occurred. In such embodiments, due to the fact that data in which the unwritable failure occurred, i.e., old data before a write processing was performed, is sent as data after a write processing to the host device, there is a possibility that secondary data would be created based on wrong data. In view of this, the next embodiment achieves a function not to send wrong data to host devices even when an unwritable failure occurs.

Figure 7:
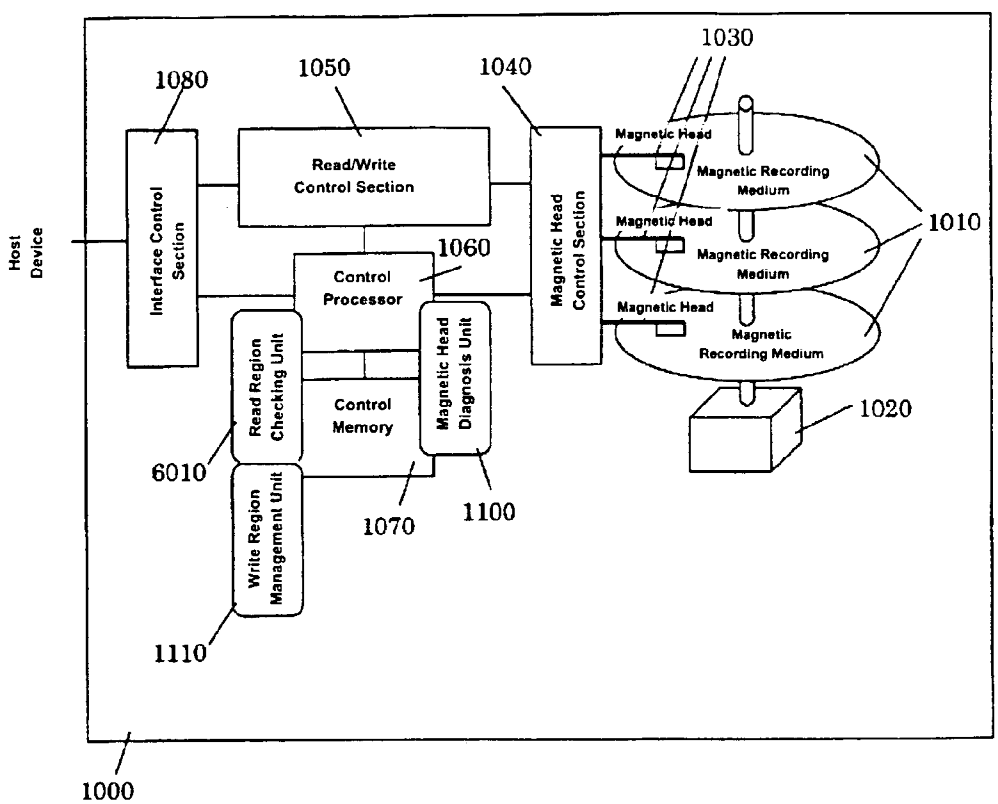
FIG. 7 is a diagram indicating an overview structure of the magnetic disk apparatus in accordance with another embodiment of the present invention.
Figure 8:
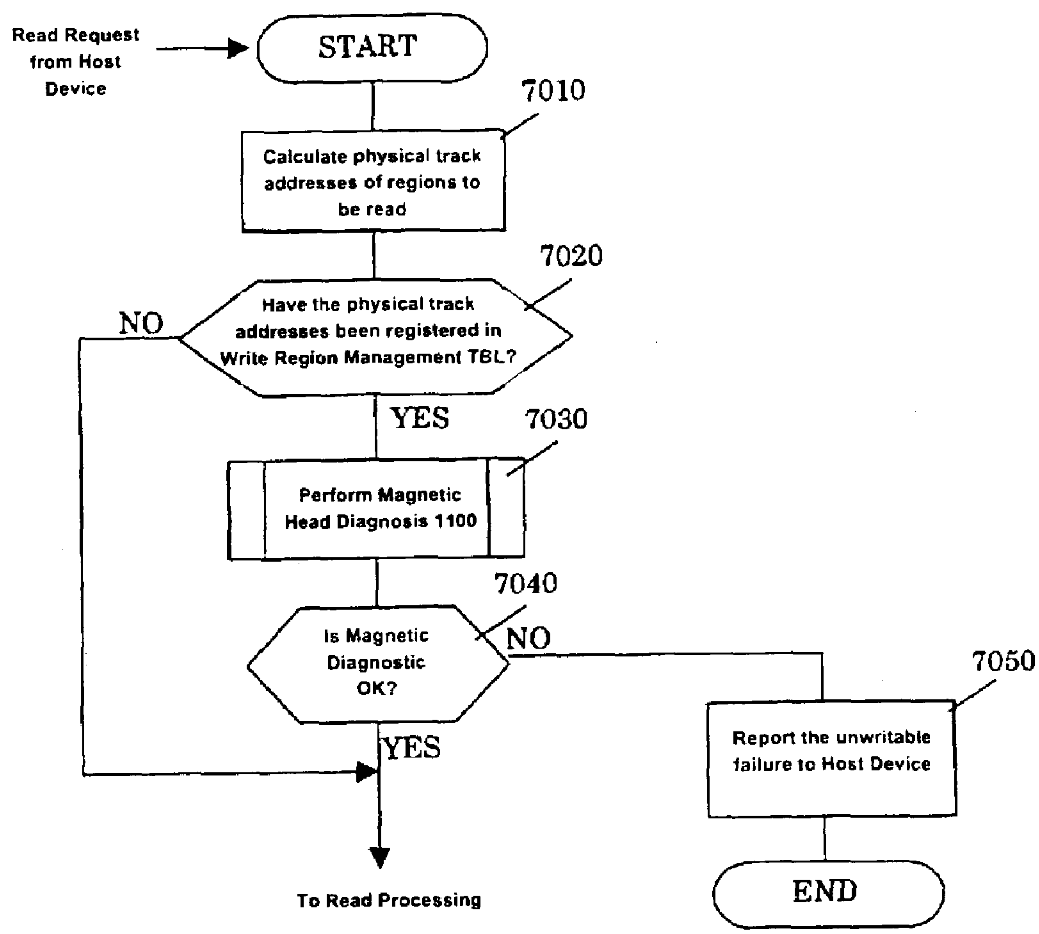
FIG. 8 is a flowchart indicating the processing of a read region checking unit in FIG. 7.

FIG. 7 shows a block diagram of such a magnetic disk apparatus in accordance with an embodiment of the present invention. The magnetic disk apparatus of the present embodiment is generally identical to the magnetic disk apparatus 1000 indicated in an earlier embodiment, but with a read region checking unit 6010 added. FIG. 8 shows a flowchart indicating the flow of processing of the read region checking unit 6010.

The read region checking unit 6010 responds to a read request from a host device and in step 7010 (FIG. 8) calculates physical track addresses corresponding to the read request. In step 7020, whether the regions that correspond to the read request from the host device as calculated in step 7010 is registered in a write region management TBL is checked. If the regions to be read are found to be registered in the write region management TBL, a magnetic head diagnosis unit 1100 is executed (step 7030). If it is determined that the write function of all magnetic heads is operating normally (YES, step 7040), a read processing is executed.

On the other hand, if in step 7020 it is determined that the regions to be read are not registered in the write region management TBL, a read processing is executed. Further, if in step 7030 it is determined through the magnetic head diagnosis unit 1100 that an unwritable failure has occurred, the occurrence of the unwritable failure is reported to the host device in step 7050 and the processing is terminated.

Figure 9:
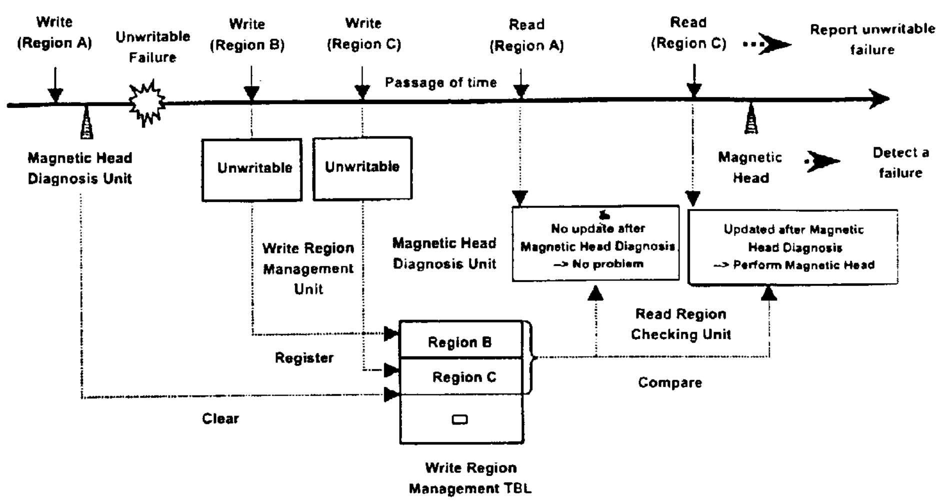
FIG. 9 is a diagram illustrating the detection of an unwritable failure and the reporting of failure occurrence in accordance with an embodiment of the present invention.

Referring to FIG. 9, the operation of the magnetic disk apparatus of the present embodiment is described below.

After writing in a region A, the magnetic head diagnosis unit 1100 goes into a periodic operation. If it is confirmed through the magnetic head diagnosis unit 1100 that the write function of all magnetic heads that are mounted on the magnetic disk apparatus 1000 is operating normally, the write region management TBL is cleared.

Neither the magnetic disk apparatus 1000 nor a disk control apparatus 5000 is aware that in reality an unwritable failure has subsequently occurred. When this happens, write requests to a region B, a region C, etc. are not satisfied, and data is not written on magnetic recording media 1010. However, the write region management TBL registers history information that indicates that the region B and the region C were accessed. In other words, regardless of whether the actual write processing was performed normally or abnormally, the fact that there were accesses to the region B and the region C, etc. is registered in the write region management TBL.

When there subsequently is a read request to the region A, the read region checking unit 6010 operates and it becomes apparent that the region A that is to be read is a region that was written on the magnetic recording medium 1010 before the corresponding magnetic head was determined to be operating normally by the magnetic head diagnosis unit 1100. In other words, the magnetic head that executed the write processing to the region A was used when its write function was operating normally. Consequently, the data in the region A on the magnetic recording medium 1010 is correct data and the read processing continues to be executed.

On the other hand, accesses to the region B and the region C are accesses that were made after it was confirmed through the magnetic head diagnosis unit 1100 that there were no abnormalities. In other words, the possibility that a new problem has occurred with the magnetic heads corresponding to these regions cannot be eliminated. Accordingly, the magnetic head diagnosis unit 1100 is executed to check whether the magnetic heads in question are operating normally. If as a result of this checking an unwritable failure is detected, an unwritable failure is reported in response to a read request of the region C.

In this way, wrong data is not sent to a host device when an unwritable failure occurs in the magnetic disk apparatus 1000.

Furthermore, due to the fact that the execution of the read region checking unit 6010 that accompanies read requests and the execution of the write region management unit 1110 that accompanies write requests take place at the same time as the seek operation of magnetic heads, the execution of the two units does not contribute to increased input/output processing time of the magnetic disk apparatus 1000.

On the other hand, due to the fact that the execution of the magnetic head diagnosis unit 1100 requires writing and reading prescribed data to and from diagnostic regions, processing time equivalent to two revolutions of the magnetic recording media is required at minimum; consequently, the timing at which the diagnoses of magnetic heads are executed becomes the question.

The diagnoses of magnetic heads take place both 1) periodically, and 2) when a region to be read is found to be registered in the write region management TBL when a read processing is attempted.

In the former, the time required for diagnosis processing of the magnetic heads can be concealed by setting the starting cycle at a few seconds. In the latter, the time required does not pose a problem since in normal input/output load environment, there is a low probability that the region to be read is registered in the write region management TBL. However, in an access pattern in which a read processing takes place immediately after a write processing, there is a possibility that the magnetic head diagnosis unit goes into operation frequently; but by connecting magnetic disk apparatuses with read region checking unit to the disk control apparatus with cache indicated in the embodiment above, even in the access pattern described above there is a high probability that the data to be read is in the cache memory of the disk control apparatus, which in practical terms means that read requests are not issued to the magnetic disk apparatuses; consequently, the time required for the magnetic head diagnosis processing (overhead) can be further reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk system comprising:

a disk control device that transfers data received from a host device;

a magnetic recording medium;

a spindle motor that rotatably drives the magnetic recording medium;

a magnetic head disposed opposing to the magnetic recording medium;

a magnetic head control section that moves the magnetic head across the magnetic recording medium;

an interface control section that controls exchanges of data with the disk control device;

a read/write control section that is provided between the magnetic head control section and the interface control section, and controls reading or writing of data between the disk control device and the magnetic recording medium;

a write region management unit that stores a data write region corresponding to a data write request issued by the host device;

a unit operable to store a data write region through the write region management unit when a data write request is issued by the host device;

a read region determination unit that, when a data read request is issued by the host device, determines whether a part of or all region to be read corresponds to the data write region that is stored by the read region management unit;

a magnetic head test unit that, when the read region determination unit determines that a part of or all of the region to be read corresponds to the data write region, tests whether data was correctly recorded on the magnetic recording media upon writing the data; and a unit that, if it is determined through the magnetic head test unit that the data was correctly written on the magnetic recording media, reads the data from the magnetic recording media and transfers the data to the host device in response to the data read request from the host device, and if it is determined that the data was not written normally, reports a read failure to the host device.

2. A disk system according to claim 1, wherein the magnetic head test unit allocates a write test region to write test data for each of the magnetic heads, positions each of the magnetic heads at the write test region, writes test data in the write test region, then reads the test data written, and compares the test data read and the test data written to check whether the test data read matches the test data written.

3. A disk system according to claim 1, wherein the magnetic head test unit allocates a write test region to write test data for each of the magnetic heads, positions each of the magnetic heads at the write test region, reads data at the write test region to confirm if each of the magnetic heads does not have a defect, thereafter writes test data in the write test region, then reads the test data written, and compares the test data read against the test data written to check whether the test data read matches the test data written.

4. A disk system according to claim 2, wherein the write test regions are positioned on the corresponding magnetic recording media at locations shifted from one another by an amount corresponding to the time required for a switching processing to switch the plurality of magnetic heads.

5. A disk system according to claim 1, wherein the write region management unit operates the magnetic head test unit when the number of write regions registered exceeds a stipulated value.

6. A disk system according to claim 5, wherein, if all of the magnetic heads are found to be operating normally, the write regions that were registered through the write region management unit are cleared, and if at least one failure is found among the magnetic heads, the failure is reported in response to all read requests and write requests from the host device.

7. A disk system according to claim 1, wherein the write region management unit periodically operates the magnetic head test unit.

8. A disk system according to claim 7, wherein, if all of the magnetic heads are found to be operating normally, the write regions that were registered through the write region management unit are cleared, and if at least one failure is found among the magnetic heads, the failure is reported in response to all read requests and write requests from the host device.

9. A disk system for connecting to a host device for reading data from and writing data to magnetic media, comprising:

a magnetic disk device;

a magnetic head diagnostic unit that diagnoses if the magnetic disk device is normal by periodically writing data in the magnetic recording media, reading the data and comparing the data read against the data written;

a disk control device that transfers data received from the host device;

a write region management unit that stores a data write region corresponding to a data write request issued from the host device;

a unit that, if an abnormality of the magnetic disk device is detected, allows the write region management unit to report a write region registered to the host device; and a unit that, if an abnormality of the magnetic disk device is not detected, allows the write region management unit to clear a write region registered.

10. A disk system according to claim 9, wherein the write region management unit operates the magnetic head diagnostic unit when the number of write regions registered exceeds a stipulated value, wherein, if all of the magnetic heads are found to be operating normally, the write regions registered through the write region management unit are cleared, and if at least one failure is found among the magnetic heads, the failure is reported in response to all read requests and write requests from the host device.

11. A disk system for connecting to a host device for reading data from and writing data to magnetic media, comprising:

a plurality of the magnetic disk devices;

a magnetic head diagnostic unit that diagnoses if a magnetic disk device is normal by periodically writing data in the magnetic recording media, reading the data and comparing the data read against the data written;

a disk control device that creates parity and other redundant data for data transferred from a central processing unit and stores the data transferred from the central processing unit and the redundant data in the plurality of the magnetic disk devices;

a data generating unit that, when the magnetic head diagnostic unit detects an abnormality of any of the magnetic disk devices, generates data on the magnetic disk device in which the abnormality is detected from the remaining magnetic disk devices other than the magnetic disk device in which the abnormality is detected;

a comparison unit that compares the data generated by the data generating unit and data on the magnetic disk device in which the abnormality is detected; and a display unit that, if the data generated by the data generating unit does not match the data on the magnetic disk device, displays a storage position of the data on the magnetic disk device as a unwritable region.

12. A disk system according to claim 11, further comprising:

a spare magnetic disk device;

a data recovery unit that, when the magnetic head diagnostic unit detects an abnormality of any of the magnetic disk devices, generates data on the magnetic disk device in which the abnormality is detected from the remaining magnetic disk devices other than the magnetic disk device in which the abnormality is detected, and stores the data generated in the spare magnetic disk device; and a comparison unit that compares the data that is stored by the data recovery unit in the spare disk device and the data on the magnetic disk device in which the abnormality is detected.

13. A disk system according to claim 11, further comprising a unit that designates whether the magnetic head diagnostic unit is to be operated when the disk system is powered on.

14. A disk system according to claim 11, further comprising a unit that designates whether the magnetic head diagnostic unit is to be operated when any of the magnetic disk devices is replaced.

15. A disk system according to claim 11, further comprising a unit that designates whether the magnetic head diagnostic unit is to be operated when a magnetic disk device is added to the magnetic disk devices.

16. A disk system according to claim 11, further comprising a unit that designates parameters to be used for detecting a failure by the magnetic head diagnostic unit when the disk system is powered on.

17. A disk system according to claim 16, wherein the unit that designates parameters is a service processor.

18. A disk system according to claim 11, further comprising a unit that designates parameters to be used for detecting a failure by the magnetic head diagnostic unit when any of the magnetic disk devices is replaced.

19. A disk system according to claim 18, wherein the unit that designates parameters is a service processor.

20. A disk system according to claim 11, further comprising a unit that designates parameters to be used for detecting a failure by the magnetic head diagnostic unit when a magnetic disk device is added to the magnetic disk devices.

21. A disk system according to claim 18, wherein the unit that designates parameters is a service processor.

* * * * *